United States Patent
Carton

(10) Patent No.: US 6,725,664 B2
(45) Date of Patent: Apr. 27, 2004

(54) SHUT-OFF SYSTEM FOR AN ORIFICE OF A DUCT, PARTICULARLY FOR AN ORIFICE OF AN AIR INLET PASSAGE THAT ALLOWS AIR INTO THE COMBUSTION CHAMBER OF A RAMJET

(75) Inventor: Laurent Carton, Saint-Florent sur Cher (FR)

(73) Assignee: Aerospatiale Matra Missiles, Paris (FR)

( * ) Notice: Subject to any disclaimer, the term of this patent is extended or adjusted under 35 U.S.C. 154(b) by 170 days.

(21) Appl. No.: 10/041,670

(22) Filed: Jan. 10, 2002

(65) Prior Publication Data

US 2004/0050062 A1 Mar. 18, 2004

(30) Foreign Application Priority Data

Jan. 12, 2001 (FR) .............................. 01 00383

(51) Int. Cl.$^7$ .............................. F02K 7/08; F02K 7/10
(52) U.S. Cl. .................. 60/767; 102/374; 220/261; 60/769
(58) Field of Search .................. 60/767, 769, 224, 60/225, 245; 137/15.1, 68.13; 102/374, 377, 378; 220/261, 281, 316, 326, 583

(56) References Cited

U.S. PATENT DOCUMENTS

| | | | | |
|---|---|---|---|---|
| 3,038,303 A | * | 6/1962 | Gose ........................ | 60/254 |
| 3,137,408 A | * | 6/1964 | Taylor ....................... | 220/326 |
| 3,535,881 A | * | 10/1970 | Schubert .................... | 60/245 |
| 3,768,255 A | | 10/1973 | Barnes, Jr. et al. ........ | 60/245 |
| 3,901,028 A | * | 8/1975 | Leingang ................... | 60/225 |
| 4,022,352 A | * | 5/1977 | Pehr ......................... | 222/153.14 |
| 4,028,886 A | | 6/1977 | Hackett ..................... | 60/245 |
| 4,047,495 A | * | 9/1977 | O'Brian ..................... | 215/224 |
| 4,441,312 A | | 4/1984 | Smith ........................ | 60/245 |
| 4,852,348 A | * | 8/1989 | Allard et al. ............... | 60/767 |
| 4,865,267 A | * | 9/1989 | Severson ................... | 244/53 B |
| 4,896,502 A | * | 1/1990 | Ravel et al. ................ | 60/767 |
| 4,909,031 A | * | 3/1990 | Grieb ........................ | 60/225 |
| 5,784,877 A | | 7/1998 | Hewitt ....................... | 60/204 |
| 6,003,302 A | * | 12/1999 | Feldman .................... | 60/767 |
| 6,058,846 A | * | 5/2000 | Boyd ......................... | 102/374 |
| 6,105,809 A | * | 8/2000 | Yamanaka .................. | 220/326 |
| 6,116,019 A | * | 9/2000 | Hallais et al. .............. | 60/245 |
| 6,557,339 B2 | * | 5/2003 | Demay et al. .............. | 60/245 |
| 6,568,554 B2 | * | 5/2003 | Booth et al. ............... | 220/316 |
| 2002/0038804 A1 | * | 4/2002 | Gourand ..................... | 220/835 |

FOREIGN PATENT DOCUMENTS

| | | |
|---|---|---|
| DE | 3242585 | 5/1984 |
| FR | 2474594 | 7/1981 |
| JP | 3057867 | 3/1991 |

* cited by examiner

Primary Examiner—Justine R. Yu
Assistant Examiner—William H. Rodriguez
(74) Attorney, Agent, or Firm—Stevens, Davis, Miller & Mosher, LLP

(57) ABSTRACT

A shut-off system for an orifice of a duct, particularly for an orifice of an air inlet passage that allows air into the combustion chamber of a ramjet, includes a shutter for shutting off the orifice of the duct, and a controllable actuating device capable of acting on the shutter to uncover the orifice. The shutter includes a removable cap which is held on the duct and a locking device which keeps the cap on the duct by at least one locked jaw, which is unlockable. The actuating device includes at least one controllable striker which is capable of unlocking the jaw in such a way as to cause the cap to be ejected from the duct and to uncover the orifice.

27 Claims, 5 Drawing Sheets

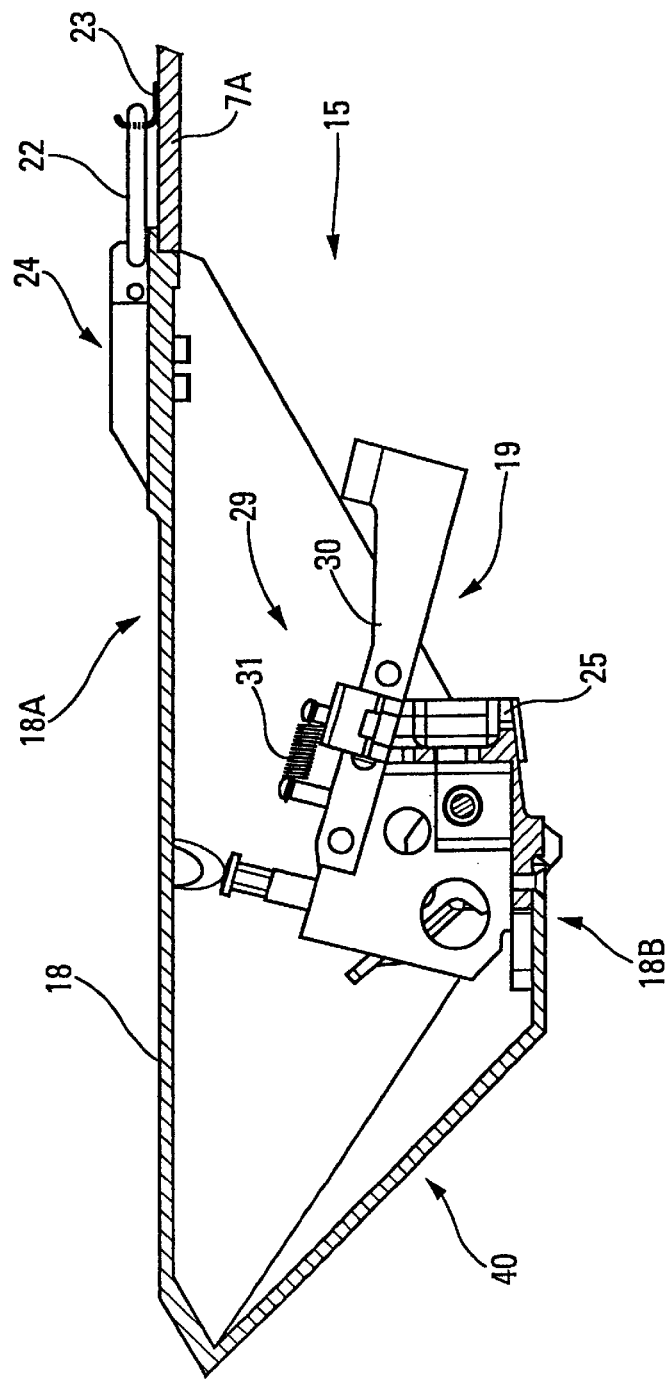
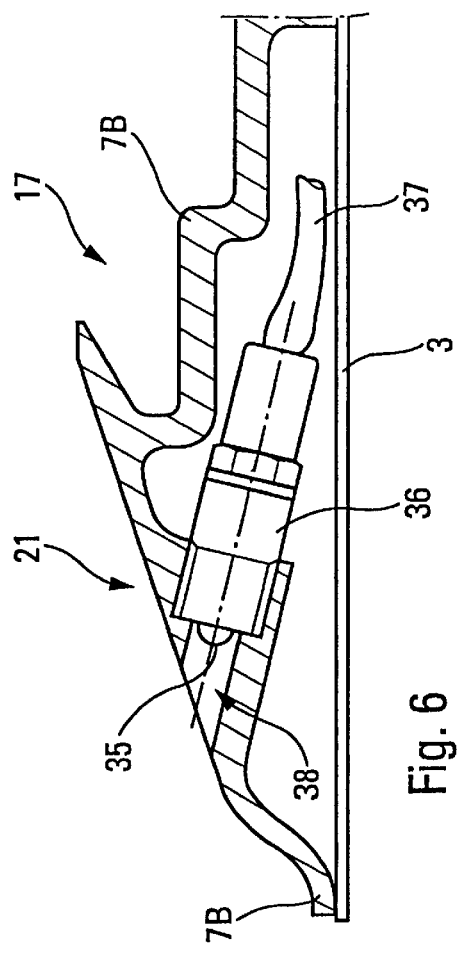
Fig. 2
Fig. 6

SHUT-OFF SYSTEM FOR AN ORIFICE OF A DUCT, PARTICULARLY FOR AN ORIFICE OF AN AIR INLET PASSAGE THAT ALLOWS AIR INTO THE COMBUSTION CHAMBER OF A RAMJET

BACKGROUND OF THE INVENTION

1. Field of the Invention

The present invention relates to a shut-off system for a duct. Although not exclusively, it relates more specifically to a shut-off system for an orifice of an air inlet passage that allows air into the combustion chamber of a ramjet.

2. Related Art

It is known that ramjets consist essentially of a combustion chamber, ending in a jet nozzle and into which liquid or gaseous fuel (which may be obtained from a solid fuel) and combustion air are introduced. This combustion air is introduced into said combustion chamber through at least one air inlet passage, of the air scoop type, which picks up air when said ramjet (or the airborne body carrying it) moves with respect to the ambient air.

Thus, for a ramjet to work, it has first of all to get up to speed with respect to said ambient air.

To achieve this, it is customary, in an initial phase of operation corresponding to getting said ramjet up to speed, for the latter to be operated as a rocket, using a consumable auxiliary propellant arranged in said combustion chamber and then, when said ramjet has reached a predetermined speed and said auxiliary propellant has been completely consumed, operation switches to ramjet mode proper, with fuel and combustion air injected into the combustion chamber.

Such a dual-mode operation (rocket mode followed by ramjet mode) means that a shut-off system has to be provided for, on the one hand, shutting off an orifice in said air inlet passage or air scoop during rocket mode operation, so as to avoid gases generated by said consumable auxiliary propellant leaking through said orifice and so as, on the other hand, to open said orifice in the air inlet passage or air scoop for ramjet operation proper.

It is known practice (see for example document JP-03057867) to use, by way of a shut-off system, a controlled-opening pivoting flap. However, in this case, it is generally necessary to provide a particularly sophisticated control system, preventing any inadvertent opening of the flap which could lead to premature ignition of said consumable auxiliary propellant and therefore to damage to the carrier (aircraft for example) of a missile equipped with said ramjet. In addition, and above all, this flap remains present on board the ramjet after the air inlet passage has been opened, and this obviously poses problems of bulk and leads to the presence of an unwanted mass during ramjet operation.

SUMMARY OF THE INVENTION

To at least partially overcome this last disadvantage, document FR-2 474 594 describes a shut-off system for an inlet orifice allowing combustion air into the combustion chamber of a ramjet, which comprises:

- a glass cover or shutter which completely shuts off said orifice during the initial phase; and
- a destruction device, namely a mechanical percussion device, which destroys this glass shutter prior to ramjet operation. During this destruction, the glass shutter is broken up into small fragments. As the orifice is downstream of the air scoop and corresponds to the mouth into the combustion chamber, these fragments are ejected to the outside, backward, by passing through the combustion chamber and the jet nozzle.

In consequence, the shutter is completely eliminated during ramjet operation.

However, this known shut-off system has certain disadvantages. First of all, there is a risk of damaging the combustion chamber and the jet nozzle by the ejection of the glass fragments through these.

In addition, the use of a mechanical percussion device comprising, in particular, a piston and a striker ending in a spike, poses certain problems. Specifically:

- either this percussion device acts frontally on the shutter, so as to be able to break it easily, in which case it is necessary to arrange the shutter in the air inlet passage which means that it disrupts the air flow during ramjet operation;
- or the percussion device is arranged outside said air inlet passage, in which case it can act only sideways on the shutter, this reducing the effectiveness of this destruction device because it is far more difficult to break the glass, and especially to break it completely, from such a position.

It is an object of the present invention to overcome these drawbacks. The present invention relates to a shut-off system for an orifice of a duct, particularly for an orifice of an air inlet passage that allows air into the combustion chamber of a ramjet, and which makes it possible:

- to open said orifice of the duct at a given moment in an effective and danger-free way, and
- to completely uncover said duct once the orifice has been opened, while at the same time alleviating the aforementioned problems of mass and bulk.

To this end, according to the invention, said shut-off system for a duct, of the type comprising:

- a shutter capable of completely shutting off said orifice of the duct; and
- a controllable actuating device capable of acting on said shutter to uncover said orifice, is notable in that said shutter comprises a removable cap which is held on said duct in such a way as to completely shut off said orifice and a locking device which keeps said cap on said duct by at least one locked jaw, which is unlockable, and in that said actuating device comprises at least one controllable striker means which is capable of unlocking said jaw in such a way as to cause the cap to be ejected from said duct and to uncover said orifice.

Thus, by virtue of the invention, said cap is ejected from the duct during unlocking, the duct is completely opened, this opening being achieved without any danger to the duct or to the elements arranged therein or near it.

In addition, said shut-off system is simple and inexpensive to produce.

Furthermore, as said cap is removable and is simply held on the duct, it is not necessary, in order to implement the present invention, to design said duct in a special way. In consequence, the present invention can be applied to any type of existing duct.

Furthermore, by virtue of said striker means, unlocking can be achieved very effectively, as will be seen in greater detail hereinbelow.

Advantageously, said striker means acts on a trap which can move under the action of said striker means.

In addition, advantageously, said trap comprises an elastic buffer to damp the action of said striker means, which makes it possible to obtain a soft impact with the trap, such a soft impact making it possible to conserve the corresponding momentum while at the same time protecting the trap and the mechanical elements associated with it.

Furthermore, advantageously, said locking device comprises:

- at least one tightening means which is capable of tightening said jaw onto the duct so as to lock it and which is capable of being moved in such a way as to unlock said jaw; and/or
- at least one attachment in the form of a loop, which can collaborate with a base in the form of a hook, which is fixed to the outer face of the duct.

In a preferred embodiment, said striker means comprises:

- at least one projectile which is capable of moving said trap when it is projected into the latter; and
- a controllable projection means capable of projecting said projectile and which is arranged outside said duct while at the same time being oriented in such a way as to be able to project said projectile into said trap.

Thus, by virtue of the invention:

- as the projection means is arranged outside the duct, it does not impede the air flow once the orifice has been opened (in ramjet mode for example), said duct being completely open; and
- as the striker means comprises the projection of a projectile, it is possible to actuate said trap and thus eject said cap in spite of the remoteness of the projection means and of the fact that it is arranged outside said duct.

In addition, by virtue of said trap, the projectile is caught and presents no danger to elements or people in the vicinity of said duct.

To optimize the precision with which the projectile impacts the trap and thus improve the effectiveness of the unlocking, the shut-off system according to the invention advantageously additionally comprises a straight guide for guiding said projectile, which straight guide is produced in the form of a canal, one end of which faces said projection means and the other end of which is directed toward said trap.

As a preference, said striker means comprises a pyrotechnic striker. This may be the striker means proper, or may be the projection means.

Furthermore, advantageously, said cap comprises an outer face which is inclined with respect to a predetermined direction that represents flow of fluid outside the duct. This makes it easier for the cap to be separated (or ejected) from said duct, when said cap is unlocked, because of the action exerted by said fluid flow on said inclined outer face.

It will be noted that the shut-off system according to the invention can be implemented on various types of duct, the opening or uncovering of which needs to be performed in the operating environment. In addition, it is able to withstand very severe mechanical, thermal, vibrational and electromagnetic stresses.

In a preferred application, the shut-off system according to the invention is intended to shut off an orifice of an inlet passage for introducing combustion air into the combustion chamber of a ramjet, said ramjet being capable, in a known way, in an initial phase of operation corresponding to said ramjet getting up to speed, of operating as a rocket by virtue of a consumable auxiliary propellant arranged in said combustion chamber and then, when said ramjet reaches a predetermined speed, of operating as a ramjet proper with fuel and combustion air injected into said combustion chamber, and said shut-off system comprising, in a known way:

- at least one shutter capable of completely shutting off said orifice during said initial phase of operation of the rocket; and
- at least one controllable actuating device capable of acting on said shutter so as to open said orifice for operation as a ramjet.

According to the invention, said shut-off system is notable in that, in addition to the aforementioned characteristics (regarding the actuating device and the shutter), said shutter shuts off the inlet orifice in the air inlet passage upstream of the latter in the direction of flow of the air in said air inlet passage.

Thus, the cap is ejected (a great distance away) from said air inlet passage, without entering the latter. In consequence, by virtue of the invention:

- on the one hand, unlike a conventional pivoting flap which remains on the ramjet after opening, an advantageous reduction in mass and bulk is achieved; and
- on the other hand, unlike a known glass shutter, the fragments of which pass through the combustion chamber and the jet nozzle, there is no risk of damage to said ramjet.

The present invention relates also to a ramjet equipped with a shut-off system like the aforementioned one, and to a missile comprising such a ramjet.

BRIEF DESCRIPTION OF THE DRAWINGS

The figures of the appended drawing will make it easier to understand how the invention may be achieved. In these figures, identical references denote elements which are similar.

FIG. 2 is a view in longitudinal section of a shutter according to the invention.

FIG. 6 shows schematically, in partial longitudinal section, a striker means of a shut-off system according to the invention.

DETAILED DESCRIPTION OF EMBODIMENTS

Figure 1:
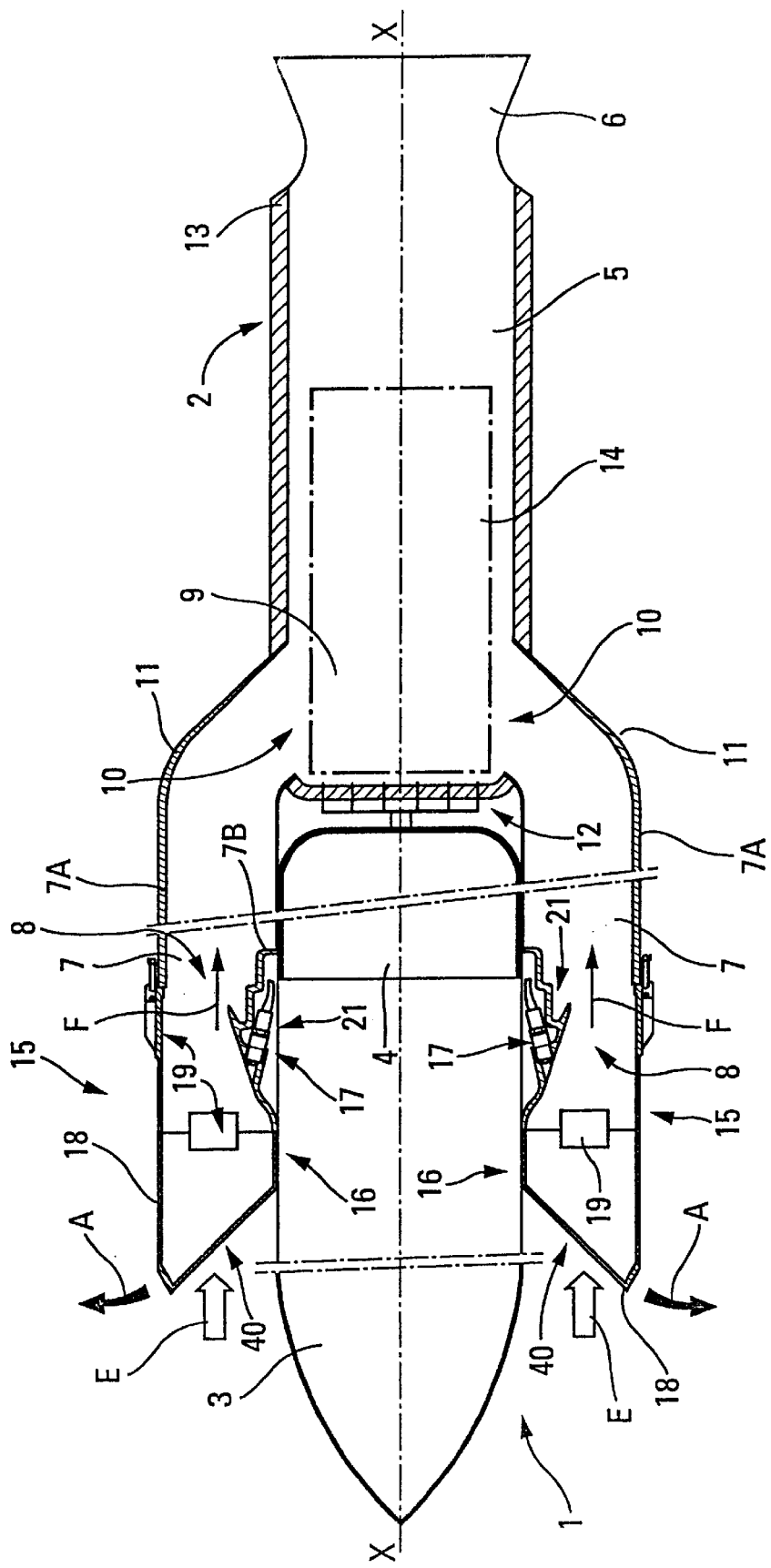
FIG. 1 schematically shows, in partial longitudinal section, a missile equipped with a ramjet of known type, the air inlet passages of which are provided with shutters ming part of shut-off systems according to the invention.

The missile 1 comprises a body 3 containing, amongst other things, the usual equipment and charges (which are not depicted because they are not involved in the invention) and a reserve of fuel 4 intended to supply the ramjet 2 and fixed to the rear part of said body 3.

The ramjet 2 comprises a combustion chamber 5 ending at the rear in a jet nozzle 6 and connected, near the front, to a number of air inlet passages of the air scoop type 7.

The air scoops 7 are arranged at the periphery of the body 3 and are secured to it. Each of them, toward the front, comprises an air inlet orifice 8 and, toward the rear, opens into the front part 9 of the combustion chamber 5 via an air outlet orifice 10 of the air scoop 7.

An elbow 11 is provided in each air scoop 7 to connect the part of the latter fixed to the outside wall of the body 3 to the orifice 10 corresponding to the inlet to the combustion chamber 5.

A fuel-injection device 12 is provided near the front part 9 of the combustion chamber 5. The device 12 is controlled by a fuel supply and regulating device (not depicted) carried by the body 3 and connected to the reservoir 4.

A heat shield coating 13 is provided on the internal walls of the combustion chamber 5.

The way in which the missile 1 operates is as follows.

Initially, after the missile 1 has been dropped from its carrier, the ramjet 2 is not in service and the missile 1 is propelled by a consumable auxiliary propellant 14 (for example a powder charge) housed inside the combustion chamber 5.

When the auxiliary propellant 14 is in operation, the air scoops 7 are shut off by shutters 15 forming part of shut-off systems 16 according to the invention and specified hereinbelow.

At the end of operation of the propellant 14, when the latter has been completely consumed, said shutters 15 are opened and air entering the air scoops 7 (in the direction indicated by arrows F) through the orifices 8 is conveyed into the combustion chamber 5 through the orifices 10.

In addition, also at the end of operation of the consumable propellant 14, the supply and regulating device supplies the injection device 12 with fuel and the latter is ignited. The ramjet then comes into operation and takes over from the propellant 14 (which has disappeared) in propelling the missile 1.

The features according to the invention are described hereinafter in respect of a single shut-off system 16, it being understood that these characteristics exist for all of the shut-off systems 16 of the ramjet 2.

Said shut-off system 16 according to the invention is of the type comprising:
  said shutter 15 which completely shuts off an orifice 8 of the air scoop 7; and
  a controllable actuating device 17 which is capable of acting on said shutter 15 so as to open said orifice 8.

According to the invention, said shut-off system 16 is notable in that:
  said shutter 15 comprises:
    a removable cap 18 which is held in such a way as to shut off the inlet orifice 8 into the air scoop 7 (illustrated by walls 7A and 7B) which lies upstream of the latter in the direction F of flow of the air in said air scoop 7; and
    a locking device 19 specified hereinbelow which keeps said cap 18 on said air scoop 7 via at least one locked jaw 20, which is unlockable. In the example depicted in FIGS. 3 and 5, the locking device 19 comprises two jaws 20; and
  said actuating device 17 comprises at least one controllable striker means 21 which is capable of unlocking said jaw 20 in such a way as to cause the cap 18 to be ejected from said air scoop 7, as illustrated by an arrow A in FIG. 1, and so as to uncover said inlet orifice 8.

Said shut-off system 16 according to the invention has numerous advantages. In particular:
  as the cap 18 is completely ejected from the air scoop 7:
    the latter is completely uncovered;
    there is no risk of damaging the air scoop 7, the ramjet 2 or the missile 1; and
    a significant and highly advantageous reduction in mass and bulk is achieved after ejection; and
  as said cap 18 is removable and is simply held on the air scoop 7, as will be seen in greater detail hereinbelow, it is not necessary for said air scoop 7 to be designed in a special way in the region of the orifice 8. The present invention can therefore be applied to any existing type of air scoop 7.

Figure 3:
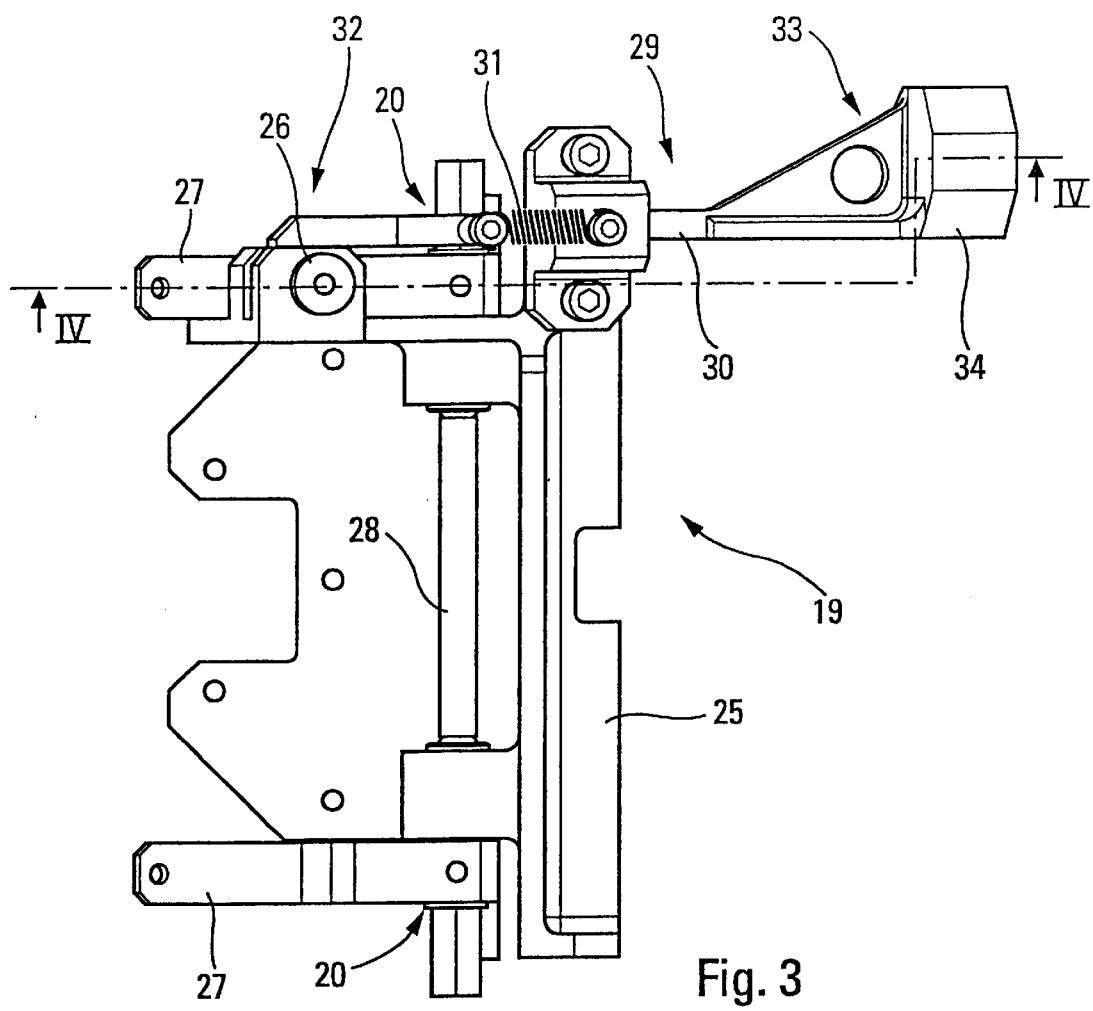
FIGS. 3 and 5 are, respectively, a plan view and a perspective view of a locking device of a shut-off system according to the invention.
Figure 4:
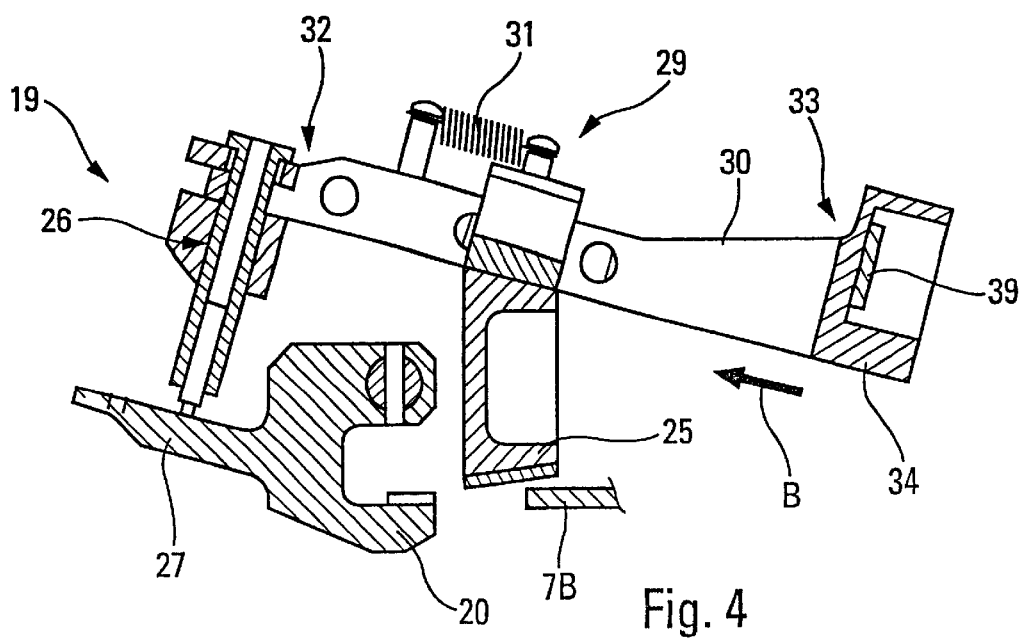
FIG. 4 is a section on IV—IV of FIG. 3.
Figure 5:
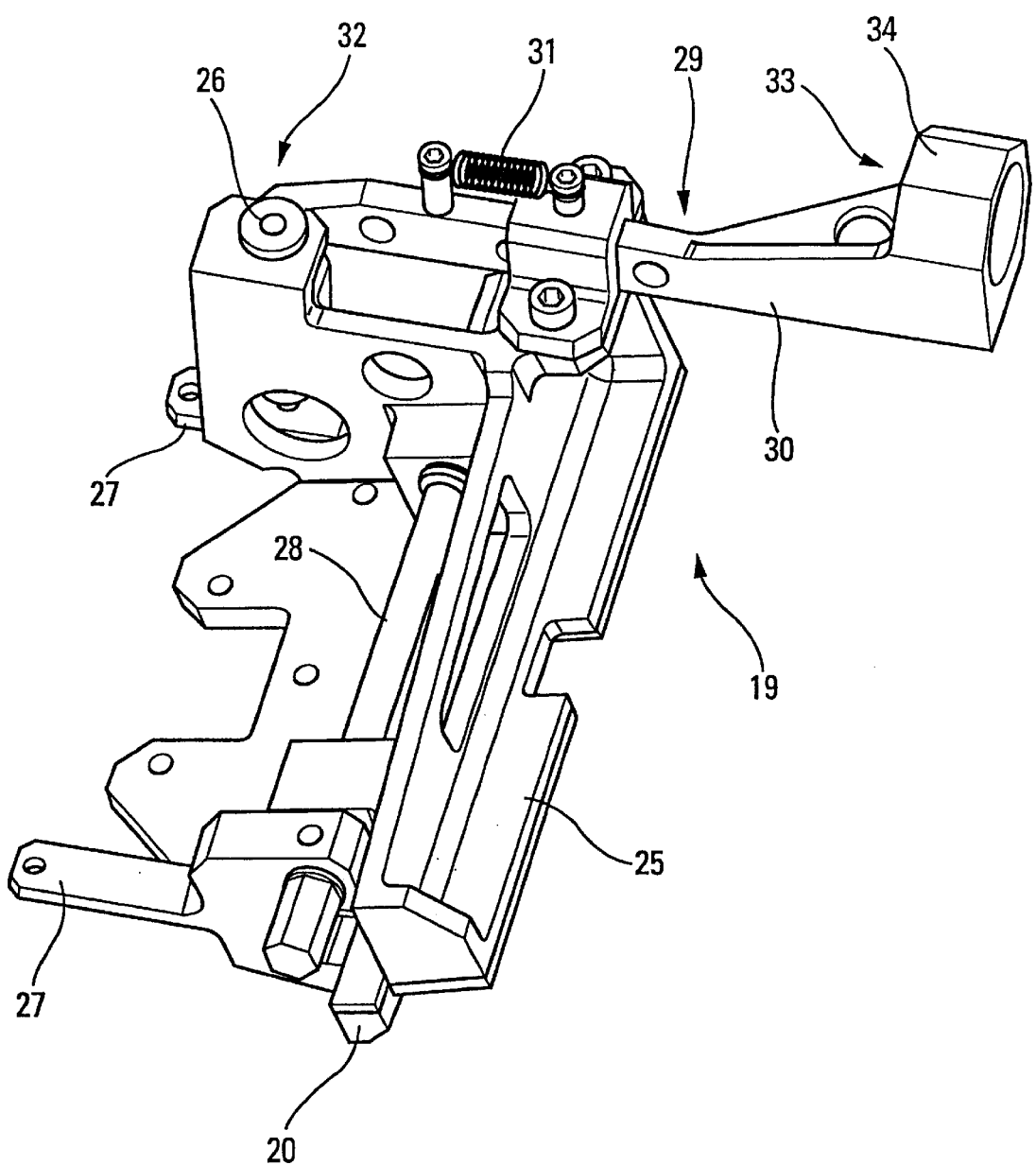

The cap 18, which is made for example of aluminum, of composite material, or of a cured foam and which is depicted in FIG. 2, is held on the air scoop 7:
  on the one hand, on the outer face 18A, via attachments 22 in the form of loops, which are associated with bases 23 in the form of hooks, which bases 23 are fixed to the outer face of the wall 7A of the air scoop 7 in the region of the orifice 8 as shown partially in FIG. 2. These attachments 22 are adjustable by conventional means 24 to cause the cap 18 to press against the lip of the air scoop 7. In addition, the bases 23 are formed in such a way that when the cap 18 is turned to a predetermined angle with respect to the fastening position, for example through 5°, the attachments 22 are released from said bases 23; and
  on the other hand, on the inner face 18B, via said jaws 20. The end of the wall 7B of the air scoop 7 is clamped, for this purpose, between, on the one hand, said jaws 20 and, on the other hand, a support 25 of the locking device 19 (see FIG. 4). This clamping is performed via a clamping rod 26 of the usual type, bearing against a tab 27 of one of said jaws 20, as depicted in FIGS. 3 to 5. Said jaws 20 which are secured to one another can turn about a spindle 28.

To unlock said jaws 20, that is to say to release the grip formed by the jaws 20 and the support 25 so as to release the wall 7B of the air scoop 7, the locking device 19 comprises an unlocking mechanism 29 which comprises a blade 30. This blade 30 is subjected to the action of a return spring 31 and can be moved in the direction illustrated by an arrow B in FIG. 4 to act via one, 32, of its ends, on the clamping rod 26 so as to free it. Said blade 30 comprises, at its other end 33, a trap 34 which is intended to collaborate with the striker means 21 of the actuating device 17.

As can be seen in FIG. 6, said striker means 21 comprises:
  at least one projectile 35, for example a metal ball, which can move said trap 34 in the direction of the arrow B when projected into the latter; and
  a controllable projection means 36 which is capable of projecting said projectile 35 and which is arranged outside said duct 7 while at the same time being oriented in such a way as to be able to project said projectile 35 into said trap 34.

In the preferred embodiment depicted in FIG. 6, said projection means 36 is produced in the form of a conventional pyrotechnic striker, of which a cord 37 for transmitting the (electrical fire) command to command the triggering of said striker 36 has been partially depicted.

Thus, by virtue of the invention:
  as the projection means 36 is arranged outside the air scoop 7, it does not impede the flow of the combustion air, once the cap 18 has been ejected, in ramjet operation; and
  as unlocking is performed by the dispatching of a projectile 35, it can be performed without there being any contact between the striker means 21 and the locking device 19.

Said striker means 21 additionally comprises a straight guide 38 for guiding the projectile 35, which straight guide is produced in the form of a canal 38, one end of which lies facing said projection means 36 and the other end of which is directed toward the trap 34, this making it possible to optimize the precision of the projection and therefore the effectiveness of the unlocking.

By way of pyrotechnic striker, use may also be made of a known actuator-type striker which does not project a projectile.

In addition, it is also conceivable for said striker means to act directly on the jaws 20 or via a mechanism which differs from the one 26, 29 depicted in FIGS. 3 to 5.

According to the invention, said trap 34 additionally comprises an elastic buffer 39 depicted in FIG. 4, to deaden the impact as the projectile 35 strikes so as to obtain a "soft" impact which makes it possible to conserve the corresponding momentum while at the same time protecting the trap 34 and the mechanical elements located near said trap 34.

Figure 7:
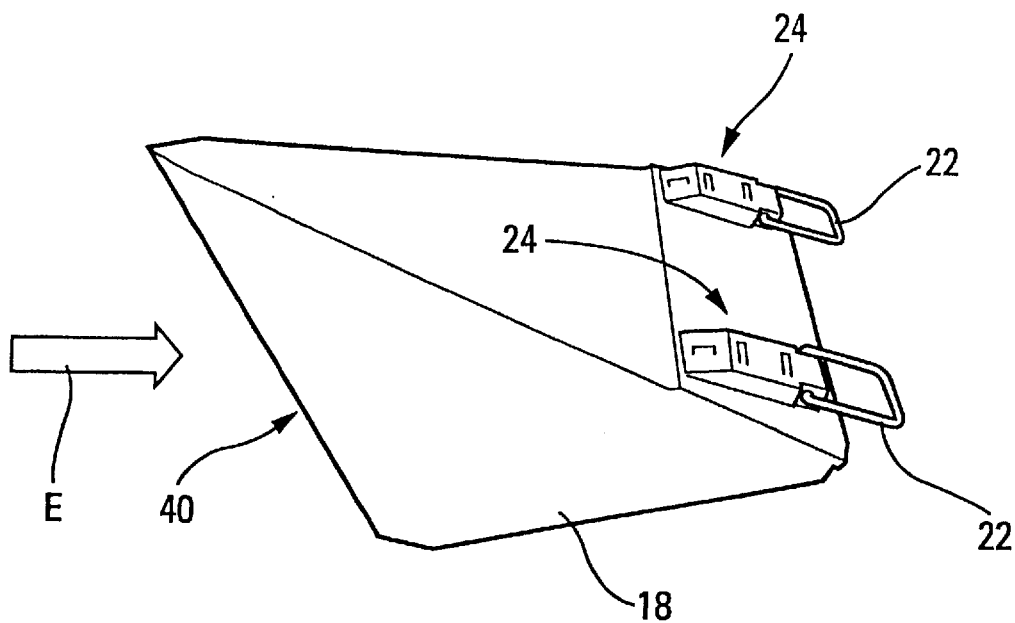
FIGS. 7 and 8 are perspective views of a cap according to the invention, shown in profile and from above, respectively.
Figure 8:
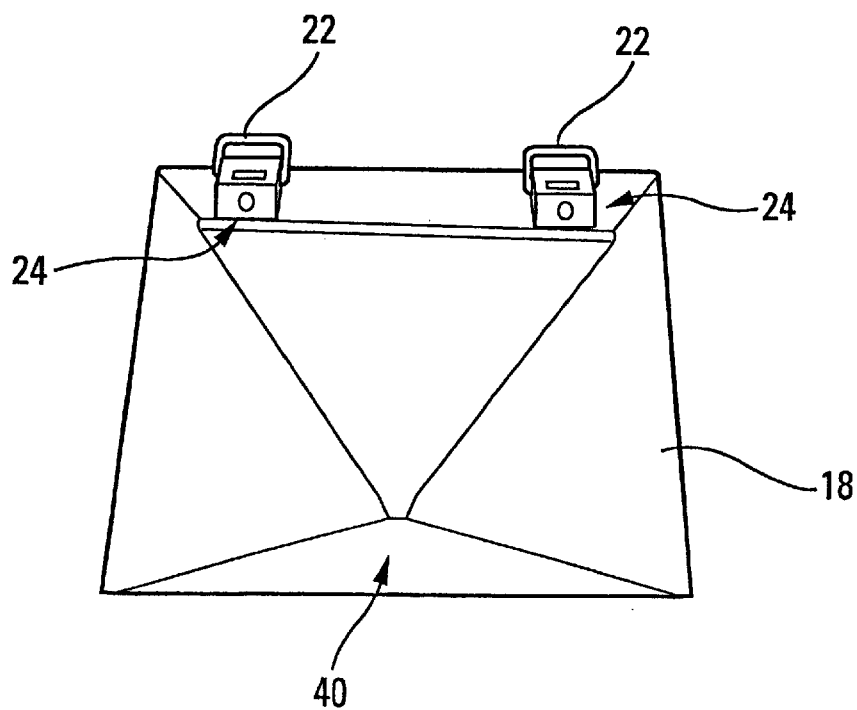

As can be seen in FIGS. 1, 7 and 8, the cap 18, of pyramid shape, has a face 40 which is inclined with respect to the flow E on the outside of the missile 1. By virtue of the force exerted by this flow E over this face 40, the cap 18 is ejected away from the air scoop 7 as soon as it is released of any mechanical stress on its lower face 18B, that is to say as soon as the jaws 20 are unlocked.

The shut-off system 16 according to the invention and presented hereinabove operates as follows.

When the propellant 14 is completely consumed, a command is sent, via the cord 37, to trigger the striker 36. The latter then projects the projectile 35 which enters the trap 34 of the locking device 19 and strikes the buffer 39 in such a way as to move the blade 30 in the direction of the arrow B. Said blade 30 therefore frees the clamping rod 26 which unlocks the jaws 20 so that the cap 18 is released on its inner face 18B. Under the effect of the flow E, said cap 18 is tipped, pivoting about the attachments 22/bases 23 connection until said attachments 23 are completely released from said bases 23. The cap 18 is then ejected some distance away from the ramjet 2 and from the missile 1.

In addition to the aforementioned advantages, the shut-off system 16 according to the invention is simple to produce and simple to operate and is inexpensive and not very bulky, particularly in the ramjet phase. In addition, by virtue of said trap 34, the projectile 35 is not ejected (separately) from the ramjet 2 at the time of unlocking. In consequence, there is no risk to the safety of individuals or objects in the close environment of the missile 1.

Of course, said shut-off system 16 according to the invention may be applied to other types of duct and not only to air scoops 7.

What is claimed is:

1. A shut-off system for an orifice of a duct, which comprises:
    a shutter capable of completely shutting off said orifice of the duct; and
    a controllable actuating device capable of acting on said shutter to uncover said orifice,
    wherein said shutter comprises a removable cap which is held on said duct in such a way as to completely shut off said orifice and a locking device which keeps said cap on said duct by at least one locked jaw, which is unlockable, and wherein said actuating device comprises at least one controllable striker means which is capable of unlocking said jaw in such a way as to cause the cap to be ejected from said duct and to uncover said orifice,
    wherein said striker means acts on a trap which is operable to move under the action of said striker means, and wherein said striker means comprises:
        at least one projectile which is capable of moving said trap when it is projected into the latter; and
        a controllable projection means which is capable of projecting said projectile and which is arranged outside said duct while at the same time being oriented in such a way as to be able to project said projectile into said trap.

2. The shut-off system as claimed in claim 1, wherein said trap comprises an elastic buffer to damp the action of said striker means.

3. The shut-off system as claimed in claim 1, wherein said locking device comprises at least one tightening means which is capable of tightening said jaw onto the duct so as to lock it and which is capable of being moved in such a way as to unlock said jaw.

4. The shut-off system as claimed in claim 1, wherein said locking device comprises at least one attachment in the form of a loop, which can collaborate with a base in the form of a hook, which is fixed to the outer face of the duct.

5. The shut-off system as claimed in claim 1, and which additionally comprises a straight guide for guiding said projectile, which straight guide is produced in the form of a canal, one end of which faces said projection means and the other end of which is directed toward said trap.

6. The shut-off system as claimed in claim 1, wherein said striker means comprises a pyrotechnic striker.

7. The shut-off system as claimed in claim 1, wherein said cap comprises an outer face which is inclined with respect to a predetermined direction that represents flow of fluid outside the duct.

8. A shut-off system for an orifice of an inlet passage for introducing combustion air into a combustion chamber of a ramjet, said ramjet being capable, in an initial phase of operation corresponding to said ramjet getting up to speed, of operating as a rocket by virtue of a consumable auxiliary propellant arranged in said combustion chamber and then, when said ramjet reaches a predetermined speed, of operating as a ramjet proper with fuel and combustion air injected into said combustion chamber, and said shut-off system comprising:
    at least one shutter capable of completely shutting off said orifice during said initial phase of operation of the rocket; and
    at least one controllable actuating device capable of acting on said shutter so as to open said orifice for operation as a ramjet,
    wherein said shutter comprises a removable cap which is held over the air inlet passage so as to shut off the inlet orifice into said air inlet passage upstream of the latter in the direction of flow of the air in said air inlet passage, and a locking device which keeps said cap on said air inlet passage via at least one locked jaw, which is unlockable, and wherein said actuating device comprises at least one controllable striker means which is capable of unlocking said jaw in such a way as to cause the cap to be ejected from said air inlet passage and so as to uncover said orifice.

9. The shut-off system as claimed in claim 8, wherein said striker means acts on a trap which can be moved under the action of said striker means.

10. The shut-off system as claimed in claim 8, wherein said striker means acts on a trap which can be moved under the action of said striker means.

11. The shut-off system as claimed in claim 8, wherein said trap comprises an elastic buffer to damp the action of said striker means.

12. The shut-off system as claimed in claim 8, wherein said locking device comprises at least one tightening means which is capable of tightening said jaw onto the duct so as to lock it and which is capable of being moved in such a way as to unlock said jaw.

13. The shut-off system as claimed in claim 8, wherein said locking device comprises at least one attachment in the form of a loop, which can collaborate with a base in the form of a hook, which is fixed to the outer face of the duct.

14. The shut-off system as claimed in claim 8, wherein said striker means comprises:

at least one projectile which is capable of moving said trap when it is projected into the latter; and a controllable projection means capable of projecting said projectile and which is arranged outside said duct while at the same time being oriented in such a way as to be able to project said projectile into said trap.

15. The shut-off system as claimed in claim 8, and which additionally comprises a straight guide for guiding said projectile, which straight guide is produced in the form of a canal, one end of which faces said projection means and the other end of which is directed toward said trap.

16. The shut-off system as claimed in claim 8, wherein said striker means comprises a pyrotechnic striker.

17. The shut-off system as claimed in claim 8, wherein said cap comprises an outer face which is inclined with respect to a predetermined direction that represents flow of fluid outside the duct.

18. A ramjet comprising a combustion chamber provided with at least one passage for introducing combustion air into said combustion chamber, and a shut-off system for an orifice of said combustion-air inlet passage, wherein said shut-off system comprises a shutter capable of completely shutting off said orifice of the duct, and a controllable actuating device capable of acting on said shutter to uncover said orifice, wherein said shutter comprises a removable cap which is held on said duct in such a way as to completely shut off said orifice and a locking device which keeps said cap on said duct by at least one locked jaw, which is unlockable, and wherein said actuating device comprises at least one controllable striker means which is capable of unlocking said jaw in such a way as to cause the cap to be ejected from said duct and to uncover said orifice.

19. The shut-off system as claimed in claimed 18, wherein said striker means acts on a trap which can be moved under the action of said striker means.

20. The shut-off system as claimed in claim 18, wherein said trap comprises an elastic buffer to damp the action of said striker means.

21. The shut-off system as claimed in claim 18, wherein said locking device comprises at least one tightening means which is capable of tightening said jaw onto the duct so as to lock it and which is capable of being moved in such a way as to unlock said jaw.

22. The shut-off system as claimed in claim 18, wherein said locking device comprises at least one attachment in the form of a loop, which can collaborate with a base in the form of a hook, which is fixed to the outer face of the duct.

23. The shut-off system as claimed in claim 18, wherein said striker means comprises:

at least one projectile which is capable of moving said trap when it is projected into the latter; and a controllable projection means capable of projecting said projectile and which is arranged outside said duct while at the same time being oriented in such a way as to be able to project said projectile into said trap.

24. The shut-off system as claimed in claim 18, and which additionally comprises a straight guide for guiding said projectile, which straight guide is produced in the form of a canal, one end of which faces said projection means and the other end of which is directed toward said trap.

25. The shut-off system as claimed in claim 18, wherein said striker means comprises a pyrotechnic striker.

26. The shut-off system as claimed in claim 18, wherein said cap comprises an outer face which is inclined with respect to a predetermined direction that represents flow of fluid outside the duct.

27. A missile, which comprises a ramjet comprising a combustion chamber provided with at least one passage for introducing combustion air into said combustion chamber, and a shut-off system for an orifice of said combustion-air inlet passage, wherein said shut-off system comprises a shutter capable of completely shutting off said orifice of the duct, and a controllable actuating device capable of acting on said shutter to uncover said orifice, wherein said shutter comprises a removable cap which is held on said duct in such a way as to completely shut off said orifice and a locking device which keeps said cap on said duct by at least one locked law, which is unlockable, and wherein said actuating device comprises at least one controllable striker means which is capable of unlocking said jaw in such a way as to cause the cap to be elected from said duct and to uncover said orifice.

* * * * *